(12) United States Patent
Millheim et al.

(10) Patent No.: US 7,284,615 B2
(45) Date of Patent: Oct. 23, 2007

(54) METHOD AND SYSTEM FOR INSTALLING AND MAINTAINING A PIPELINE WHILE MINIMIZING ASSOCIATED GROUND DISTURBANCE

(75) Inventors: Keith K. Millheim, The Woodlands, TX (US); Ali G. Kadaster, The Woodlands, TX (US)

(73) Assignee: Anadarko Petroleum Corporation, The Woodlands, TX (US)

( * ) Notice: Subject to any disclaimer, the term of this patent is extended or adjusted under 35 U.S.C. 154(b) by 526 days.

(21) Appl. No.: 10/929,530

(22) Filed: Aug. 30, 2004

(65) Prior Publication Data

US 2006/0065442 A1    Mar. 30, 2006

(51) Int. Cl.
*E21B 7/12* (2006.01)
*E21B 7/136* (2006.01)

(52) U.S. Cl. .................. 166/358; 166/368; 175/9; 175/61

(58) Field of Classification Search ............. 166/367, 166/366, 358; 405/184; 175/5–10, 61, 53
See application file for complete search history.

(56) References Cited

U.S. PATENT DOCUMENTS

| | | | |
|---|---|---|---|
| 3,595,312 A | 7/1971 | Matthews, Jr. | |
| 3,934,647 A | 1/1976 | Bokenkamp | |
| 4,016,942 A | 4/1977 | Wallis, Jr. et al. | |
| 4,043,136 A * | 8/1977 | Cherrington | 405/161 |
| 4,127,003 A | 11/1978 | Vilain | |
| 4,220,203 A | 9/1980 | Steeman | |
| 4,785,885 A | 11/1988 | Cherrington et al. | |
| 5,450,902 A | 9/1995 | Matthews | |
| 5,597,045 A * | 1/1997 | Sass et al. | 175/62 |
| 6,026,913 A * | 2/2000 | Mandal et al. | 175/45 |
| 6,422,318 B1 * | 7/2002 | Rider | 166/380 |
| 6,571,873 B2 * | 6/2003 | Maus | 166/250.07 |
| 6,682,264 B1 * | 1/2004 | McGillis | 405/184 |

FOREIGN PATENT DOCUMENTS

SU          1231149 A1    5/1986

* cited by examiner

*Primary Examiner*—Thomas A Beach
(74) *Attorney, Agent, or Firm*—Raymond R. Ferrera

(57) ABSTRACT

A pipeline installation and maintenance method and system is disclosed in which a number of interconnectible platform modules are assembled into drilling platforms from which a segmented pipeline route is flexibly installed. Using modified push/pull rigs to carry out a transverse drilling process established between platforms, successive portions of the pipeline are installed such that equipment used to create completed segments is moved down line and re-used in subsequent drilling and installation stages. Further segments of the line are similarly constructed, using one or more of the modified directional drilling techniques and transverse reaming processes disclosed herein. Ultimately, a long series of adjacent pipeline segments are installed along a desired pipeline route, while only minimal and temporary disturbance is caused to associated ground surfaces during installation and maintenance operations.

29 Claims, 5 Drawing Sheets

METHOD AND SYSTEM FOR INSTALLING AND MAINTAINING A PIPELINE WHILE MINIMIZING ASSOCIATED GROUND DISTURBANCE

STATEMENT OF RELATED CASES

The instant application is related to prior application Ser. No. 10/434,436, filed May 8, 2003, entitled Method and System for Building Modular Structures from which Oil and Gas Wells are Drilled.

FIELD OF THE INVENTION

The present invention relates generally to pipeline installation and maintenance technologies, and in a specific, non-limiting embodiment, to a method and system for installing and maintaining a pipeline without trenching or otherwise significantly disturbing associated ground surfaces.

BACKGROUND

A wide variety of industrial applications require access to man-made transport conduits in order to safely and efficiently practice associated technologies. For example, liquid and gas transportation services, utilities, communications and power installations, fiber optics, and slurry and water transportation facilities all require pipeline access in order to carry out their various operations.

Other technical fields requiring pipeline installations include oil and gas exploration and production. However, many potential oil and gas exploration and production sites are significantly constrained by environmental regulations and other special circumstances that make transportation, installation and maintenance of pipeline equipment difficult or impossible to readily achieve.

For example, oil and gas reserves are often found in terrain with near-surface water accumulations, such as swamps, captive lakes, estuaries, shorelines, and permafrost regions. In the case of swamps, the ground is generally too soft to safely support trucks and other heavy equipment required to deliver and install pipeline trenching and support equipment. Captive lakes are also troublesome, especially when disposed between terminal points of a pipeline installation; in such cases, the pipeline generally has to be re-routed around the lake, which greatly increases the complexity and expense of the operation. Near estuaries and shorelines, the associated land-to-water interface is often unsuitable for supporting pipeline installation equipment, while in permafrost regions, installation of heavy equipment is supportable only during certain months of the year, viz., those winter months when the ground surface is securely frozen. In still other regions, for example, near gorges and canyons, interfering terrain features often effectively preclude cost-efficient drilling and production of oil and gas reserves.

Under cities and towns, the technical aspects of pipeline installation and maintenance are generally more straightforward, since associated ground surfaces are usually firmer and more capable of supporting multiple conduit and infrastructure installations than wilderness regions; however, costs associated with rights of way and competition for shared physical resources can greatly diminish the value of a prospective pipeline operation. Conversely, shoreline regions often pose significant construction and maintenance challenges for pipeline operations, and environmental constraints can significantly impact the location of a pipeline route and the means by which it is installed and maintained.

Many regions in which oil and gas reserves are disposed are also environmentally sensitive, and surface access by heavy transport vehicles can seriously damage the underlying terrain and/or affect wildlife breeding areas and migration paths. Such problems are particularly acute in arctic tundra and permafrost regions, where road construction is often prohibited or limited to temporary seasonal access, and operations are frequently encumbered by wildlife and regulatory concerns.

Wherever a well is drilled and produced, the resulting oil and gas must eventually be transported from the wellhead to either a storage or transportation facility. Currently, the most common method of transporting oil and gas is by means of a pipeline. Under normal circumstances, pipelines are run above ground and affixed to a series of braces set in trenches dug into a ground surface. Other pipelines, including those that run shorter distances under obstacles such as buildings or rivers, are typically carried out by either tunneling operations or horizontal drilling technology. Tunneling operations, however, are much more expensive and complicated than trenching technology, and thus pipelines are generally disposed above surface trenches whenever possible.

Since tunneling is generally the most expensive and complicated fluid transport solution, and since the setting of trenches in premium locations sought by drillers and explorers is often prohibitively difficult and expensive to achieve, there is presently a widespread need for a system and method of installing and maintaining a pipeline that is independent of both trenching and tunneling technologies, and especially for a system and method that avoids trenching and tunneling while minimizing disturbance to associated ground surfaces during pipeline installation and maintenance operations.

SUMMARY OF THE INVENTION

A system for installing and maintaining a pipeline is provided, the system comprising a first source platform disposed at a first drilling site; a first receiving platform disposed at a second drilling site; a first directional drilling rig disposed on said first source platform; and a first drilling means disposed on said first source platform, wherein said first directional drilling rig pushes said first drilling means from said first drilling site toward said second drilling site in a manner such that said first drilling means drills a subsurface hole between said first source platform and said first receiving platform. Several representative examples of drilling platforms, directional drilling rigs, and drilling means appropriate for practicing the invention are also provided.

A method of installing and maintaining a pipeline is also provided, the method comprising disposing a first source platform at a first drilling site; disposing a first receiving platform at a second drilling site; disposing a first directional drilling rig on said first source platform; disposing a first drilling means on said first source platform; and using said first directional drilling rig to push said first drilling means from said first drilling site toward said second drilling site in a manner such that said first drilling means drills a subsurface hole between said first source platform and said first receiving platform. Several representative examples of methods for disposing and using the various drilling platforms, directional drilling rigs, and drilling means disclosed herein are also provided.

DETAILED DESCRIPTION OF THE INVENTION

Figure 1:
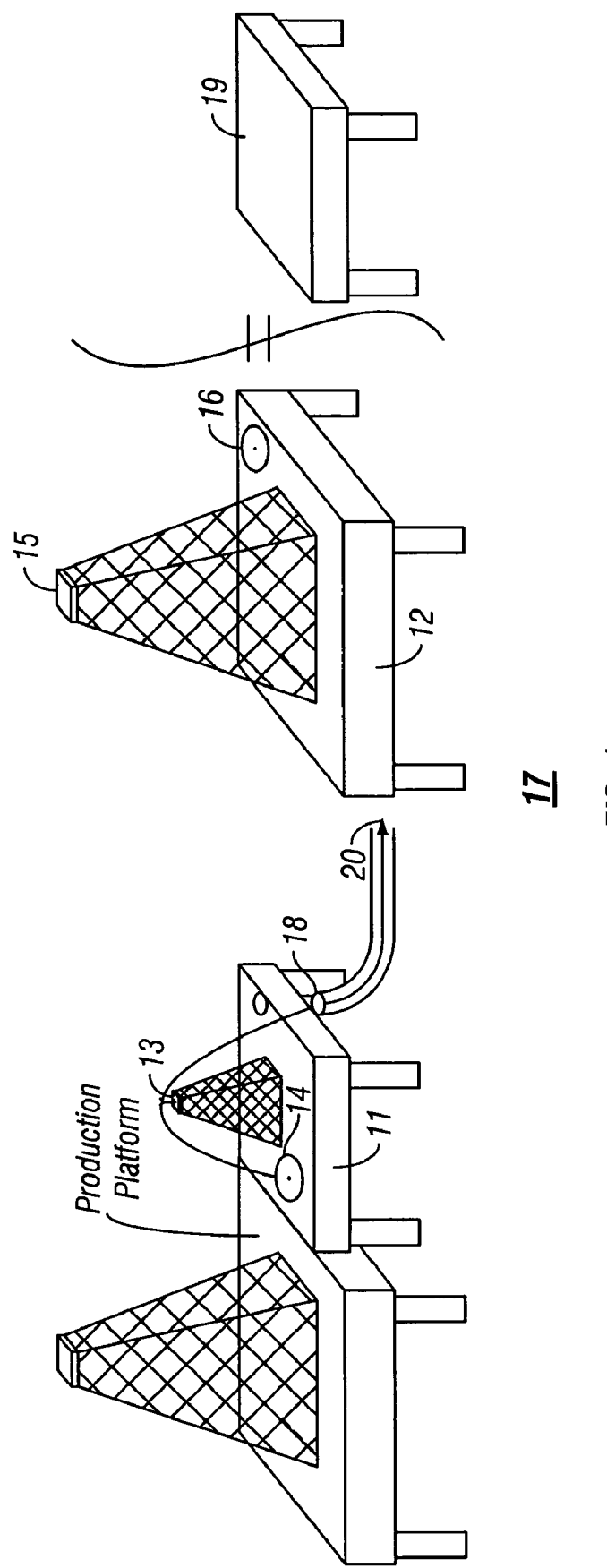
FIG. 1 depicts a first stage of the invention, wherein a first push/pull rig disposed on a first source platform initiates the drilling of a subsurface hole in the direction of a first receiving platform; meanwhile, a second receiving platform is being assembled further down the line for use when the pipeline segment established between the first source platform and the first receiving platform has been completed.

Referring now to FIG. 1, a specific, non-limiting embodiment of the invention is provided, wherein a first source platform 11 is disposed in convenient geographic proximity with a first receiving platform 12. A first drilling rig 13 and a first drilling means 14 capable of drilling a subsurface hole 18 between the source platform and the receiving platform are installed on source platform 11, and a second drilling rig 15 having a second drilling means 16 is installed on first receiving platform 12.

In a preferred embodiment, first drilling rig 13 is a modified push/pull rig, capable of drilling a subsurface hole 18 using drilling means 14. In other embodiments, second drilling rig 15 is also a push/pull rig, capable of grasping first drilling means 14 and attaching it to second drilling means 16, so that first and second drilling means 14 and 16 can be pushed and pulled back and forth in a transverse reaming fashion after drilling means 14 and 16 have been joined. In a presently preferred embodiment, drilling means 14 is a length of coiled tubing that is pushed by first push/pull rig 13 toward first receiving platform 12, and then fastened to a second length of coiled tubing 16 disposed on the receiving platform after the starter hole has been completed.

Those of ordinary skill in the art, however, will appreciate that many other drilling means, such as pipe casing or jointed drilling pipe, etc., can be substituted in place of coiled tubing without departing from the scope or spirit of the invention. Likewise, the invention can also be practiced with other types of drilling rigs, for example, horizontal drilling rigs (especially in instances where casing or drilling pipe are employed as the drilling means), and accumulated casing or drilling pipe can then be stacked or otherwise stored on the platforms rather than gathered or wound on spools.

The invention can also be practiced by replacing second drilling means 16 with a blank reel or spool; in such instances, first drilling means 14 is gathered and wound around the spool, and drilling means 14 is reeled back and forth between the source and receiving platforms. In other embodiments, second drilling means 16 is omitted altogether, and second push/pull rig 15 is used to push drill pipe or pipe casing back through the subsurface hole toward first source platform 11. In one example embodiment, first drilling means 14 is attached directly to the drill pipe or pipe casing so that first source platform 11 assists in feeding the pipe through the subsurface hole by pulling the pipe back toward the source platform while the receiving platform is used to push the pipe into and through the subsurface hole.

In some embodiments, the pilot bit used to facilitate drilling of subsurface hole 18 is removed from first drilling means 14 after first drilling means 14 emerges from associated ground surface 17 in the proximity of first receiving platform 12. The pilot bit is then replaced with a fastening member (e.g., a swivel or a grasping member, etc.) and attached to a larger bit installed on second drilling means 16 so that the larger bit is pulled back through the subsurface hole 18 by first push/pull rig 13 while second push/pull rig 15 pushes the larger bit into the hole. In other embodiments, the transverse reaming process is assisted by a downhole motor, which lends additional power to advancement of the larger bit so that the pulling power required of first push/pull rig 13 and the pushing power required of second push/pull rig 15 is reduced; such an embodiment also helps to improve borehole stability during the drilling process, since vertical forces applied to first and second drilling means 14 and 16 by first and second push/pull rigs 13 and 15, respectively, are minimized in favor of the lateral force applied to the larger bit by the downhole motor (not shown).

According to one example embodiment, the method of the invention is initiated by fitting a length of coiled tubing 14 with a pilot bit 20, and then using the first push/pull rig 13 to push or drill the bit into an associated ground surface 17. In this manner, a subsurface hole 18 is established in ground surface 17 between first source platform 11 and first receiving platform 12 through which additional lengths of coiled tubing 14 are continuously advanced.

During operations, an advanced length of coiled tubing 14 can be withdrawn from starter hole 18, if necessary, to refit the tubing with a different drill bit, for example, as might be required if the first drill bit were to break. The pilot bit 20 used to cut starter hole 18 might also need to be replaced with a bit having a harder leading edge in cases where terrain features encountered by the pilot bit become harder or rockier as the starter hole is dug deeper and further along into associated ground surface 17.

In some embodiments, each of first source platform 11 and first receiving platform 12 further comprise a plurality of multifunctional, interconnected platform modules, at least one of which is equipped with an appropriate means for spooling an accumulated length of coiled tubing 14. However, either of first source platform 11 or first receiving platform 12 can be replaced with other conventional drilling platforms (for example, by known horizontal drilling rig platforms), which are typically installed and supported on a gravel pad, a matting, an ice pad, a hovercraft, a truck or another appropriate support structure.

The distance at which first receiving platform 12 is spaced apart from first source platform 11, and the depth and angle of declination at which starter hole 18 is drilled relative to associated ground surface 17, are largely dependent upon tactical considerations imposed by the nature of the drilling site and related permit and access issues. For example, if a drilling operation calls for installing a pipeline system beneath an intervening terrain feature (e.g., a lake, or town, or a low-lying accumulation of ground water), it is desirable to carefully calculate both the minimum depth at which the subsurface hole in which the pipeline will ultimately be disposed and the minimum angle at which the line must be arced relative to the ground surface, so as to safely and conservatively establish the spacing distance between first source platform 11 and first receiving platform 12. Generally, careful estimation of the initial depth to which the starter hole 18 must be dug will also be required. For sighting purposes, it is desirable in some instances to dispose one or more directional beacons (not shown) at appropriate intervals along the ground surface 17 in order to ensure that the subsurface line is being established safely within predetermined operational parameters.

On the other hand, in an operation encumbered primarily by regulatory controls rather than particularly difficult terrain features, or where a drilling permit merely requires a pipeline to be fully submerged beneath the ground surface, the drilling depth and declination angle may be slightly less important, so long as the conditions of the permit or regulatory control (i.e., that the pipeline be fully buried beneath the ground surface) are satisfied.

In some embodiments, while drilling activity between first source platform 11 and first receiving platform 12 is carried out, construction of a second receiving platform 19 is also initiated. In one such embodiment, construction of second receiving platform 19 (including a push/pull rig and spool system) is completed around the time the first pipeline segment established between first source platform 11 and first receiving platform 12 is completed.

Figure 2:
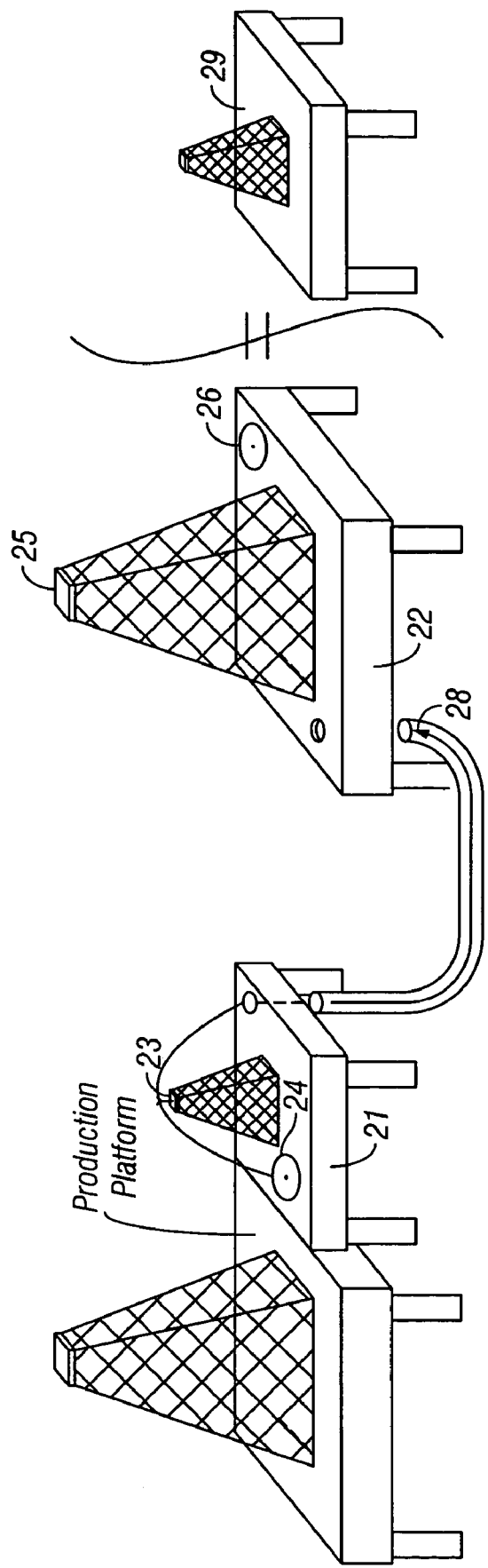
FIG. 2 depicts the first source platform and the first receiving platform shown in FIG. 1, wherein the subsurface hole drilled between the first source platform and the first receiving platform has been completed, and a second push/pull rig disposed on the first receiving platform receives the means for drilling a hole pushed from the first push/pull rig.

Referring now to FIG. 2, after the starter hole has been established in the direction of first receiving platform 22, first push/pull rig 23 is used as a pusher rig to advance the coiled tubing 24 through ground surface 27 until pilot bit 28 finally emerges in the geographic proximity of first receiving platform 22. As mentioned, initial traversal of the distance between first source platform 21 and first receiving platform 22 is carried out using a pilot bit 28 having a relatively small diameter, which for purposes of the present discussion shall be defined herein as diameter $d_1$.

In some embodiments, the vertical depth of the subsurface hole relative to associated ground surface 27 is selected so as to provide for good subsurface soil or rock stability. In other embodiments, for example, pipeline systems installed in arctic regions, the subsurface hole should be disposed well below the thaw zone so as to ensure that the pipeline will remain submerged when surface ice melts in warmer seasons. According to one embodiment, the depth of the subsurface hole is less than about 500 feet, whereas in other embodiments the depth is greater than about 500 feet.

According to a presently preferred embodiment, the subsurface hole is disposed underground at a depth of between about 20 feet and about 300 feet measured relative to associated ground surface 27. In still other embodiments, the depth of the subsurface hole is selected taking into consideration primarily environmental or safety concerns. For example, in some embodiments the subsurface hole is drilled either between or below interposed impermeable ground formations in order to contain any line leakage that may occur, so that contaminants do not leak out into associated ground surface 27.

In any event, when the subsurface hole between platforms is completed, the coiled tubing is adjusted to route the hole back toward the surface so that pilot bit 28 emerges in the geographic proximity of first receiving platform 22. In some embodiments, pilot bit 28 is removed from coiled tubing 24 and replaced with a fastening member, which is fastened to joined lengths of pipe or pipe casing and then pulled back through the hole by first push/pull rig 23; in other embodiments, second push/pull rig 25 also pushes the pipe or pipe casing through the hole while the pipe or pipe casing is pulled by first push/pull rig 23 back toward first source platform 21. In still other embodiments, pilot bit 28 is removed from coiled tubing 24, so that coiled tubing 24 can be gathered by second push/pull rig 25 and then reeled about a blank receiving spool 26; in one embodiment, coiled tubing 24 is then reeled back and forth between first push/pull rig 23 and second push/pull rig 25 to enlarge the diameter of the subsurface hole.

As the process of establishing the subsurface hole between first source platform 21 and first receiving platform 22 nears completion, construction of second receiving platform 29 should also be nearing completion. As seen in the embodiment depicted in FIG. 2, assembly of the platform modules used to form second receiving platform 29 is completed and the platform is equipped with a third push/pull rig around the same time the subsurface hole established between first source platform 21 and first receiving platform 22 has been fully bored.

Figure 3:
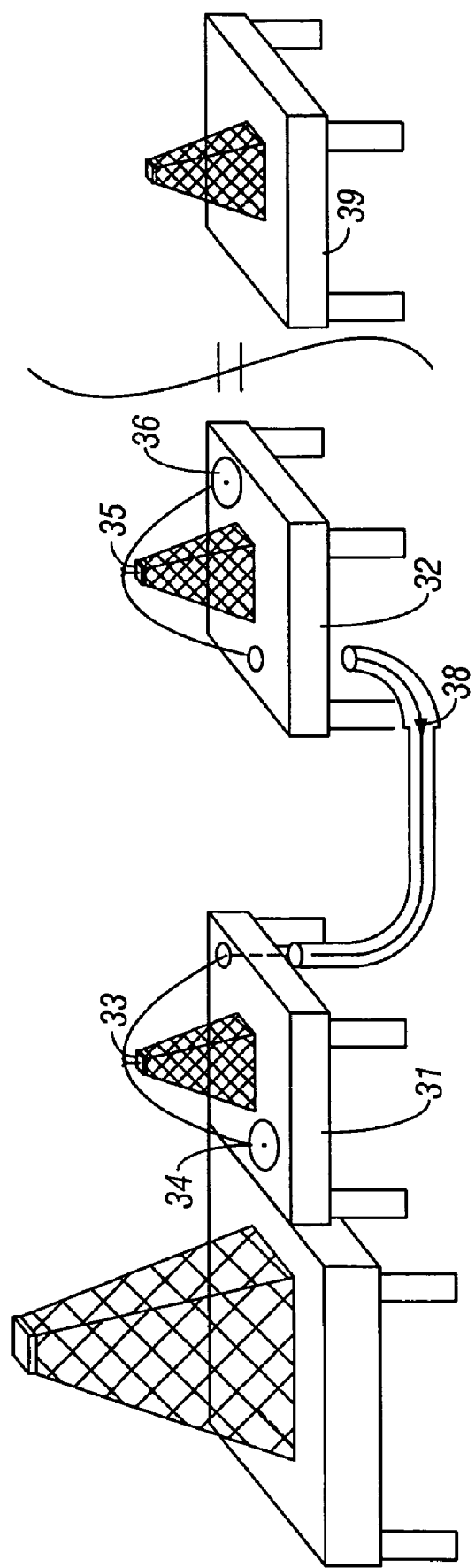
FIG. 3 depicts the first source platform and the first receiving platform shown in FIG. 1, wherein the second push/pull rig disposed on the first receiving platform pushes the drilling means (which is now equipped with a larger bit than the pilot bit used to drill the starter hole) back toward the first source platform, while the first push/pull rig pulls the drilling means back toward the first source platform, thereby enlarging the diameter of the starter hole.

As seen in the embodiment depicted in FIG. 3, after the subsurface hole established between first source platform 31 and first receiving platform 32 is complete and first drilling means 34 has emerged from ground surface 37, the pilot bit is removed and replaced by a first fastening member (e.g., a swivel or a rotating grasping member). A second drilling means 36 is then reeled out from first receiving platform 32; in a preferred embodiment, second drilling means 36 is a second length of coiled tubing equipped with a reaming assembly. In some embodiments, second drilling means 36 is comprised of a second fastening member (again, a swivel or a rotating grasping member of some type) and a larger bit having a diameter $d_2$, and the second fastening member is attached to the first fastening member disposed on the end of the first length of coiled tubing.

In other embodiments, the reaming assembly further comprises a downhole motor used to assist advancement of larger drill bit 38 and the joined coiled tubing back through the subsurface hole. Since the two lengths of coiled tubing are attached, second push/pull rig 35 is used to push the connected string into the subsurface hole and back toward first source platform 31. String advancement is further facilitated using first push/pull rig 33 to pull the attached string back through the subsurface hole toward first source platform 31.

In any event, the diameter of subsurface hole 37 is thereafter further enlarged by subsequent traversals of the coiled tubing back and forth through the hole. In a presently preferred embodiment, the subsurface hole enlargement process further comprises removing the pilot bit having a diameter $d_1$ after an entire segment of subsurface hole 37 has been established, and replacing the pilot bit with a larger bit 38 having a diameter $d_2$. In this embodiment, first push/pull rig 31 is used as a puller rig in order to pull the coiled tubing attached bit 38 back toward first source platform 31, while first receiving platform 32 is use as a pusher rig to push the larger bit 38 back toward first source platform 31, either with or without the assistance of a downhole motor (not shown). If necessary, the back and forth transverse reaming process described above is repeated using increasingly larger drill bits, e.g., bits having a diameter $d_3$, $d_4$, . . . $d_n$, until the subsurface hole established between first source platform 31 and first receiving platform 32 is bored to a desired diameter, and the subsurface hole is stable and uniform enough to accommodate installation of joined pipe or pipeline casing.

Figure 4:
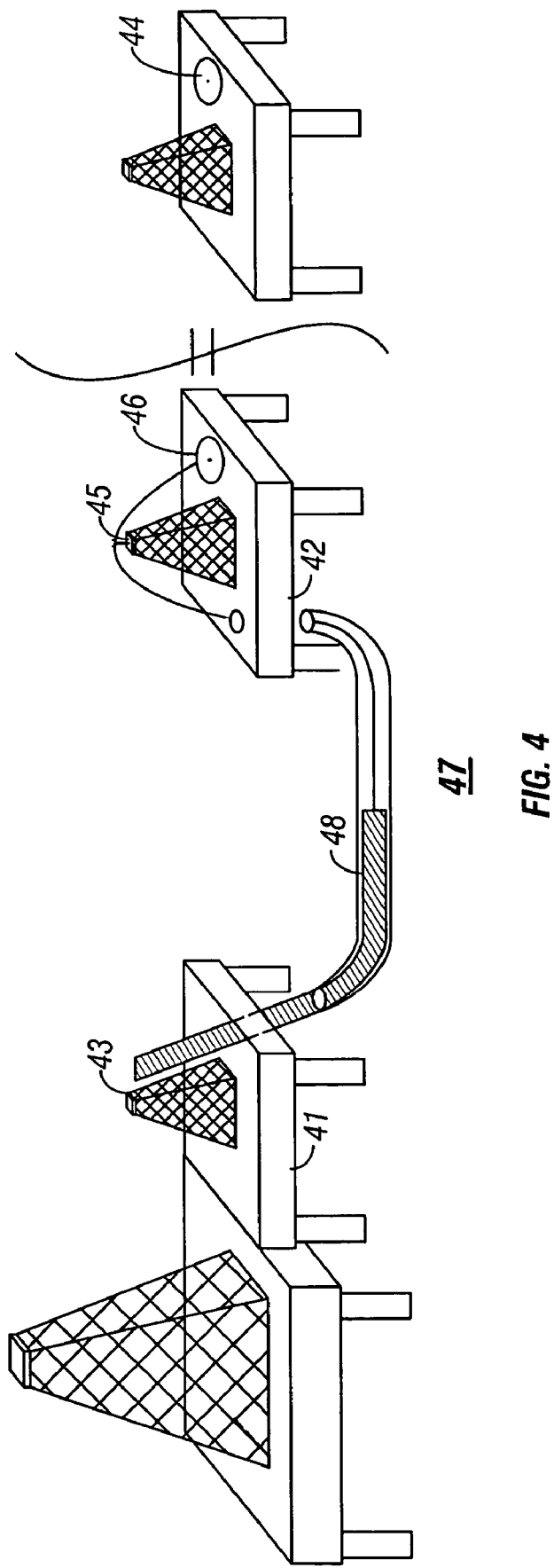
FIG. 4 depicts the first source platform and the first receiving platform shown in FIG. 1, wherein the diameter of the subsurface hole has been sufficiently enlarged that the first push/pull rig can push a first segment of pipeline casing or jointed pipe back toward the first receiving platform; in a preferred embodiment, the second push/pull rig also pulls the pipeline casing or jointed pipe back toward the first receiving platform.

Turning now to FIG. 4, once the subsurface hole has been drilled to a desired diameter, first push/pull rig 43 is used to push segments of joined drill pipe or pipeline casing into the hole in the direction of first receiving platform 42. In a preferred embodiment, the final drill bit used in widening the hole is removed from second drilling means 46 and replaced with a fastening member, e.g., a swivel or another appropriate grasping means, and fastened to the end of the pipe or casing 48. In this manner, second push/pull rig 45 assists in installation of the pipe or casing 48 by pulling it back toward the first receiving platform 42, while first push/pull rig 41 pushes the pipe or casing 48 away from first source platform 41 and further along into the subsurface hole.

In some embodiments, it is desirable to install a number of smaller, interconnected pipe segments, so that the line is somewhat flexible, and is not as susceptible to horizontal shearing forces caused by ground movements or the like as a single, rigid length of pipe might be. In other embodiments, concentric pipe segments are installed, so that any leakage that may occur in the line is contained, and innermost portions of the line are better insulated against freezing, etc.

In the embodiment depicted in FIG. 4, the remaining equipment required for the second receiving platform to participate in the next stage of the installation process is delivered and assembled as installation of the pipe or casing 48 through the subsurface hole proceeds. For example, a third spool 44 of coiled tubing or a blank reel suitable for gathering and winding coiled tubing is now assembled in tandem with a push/pull rig, and the second receiving platform awaits only completion of the first pipeline segment before commencing operations.

In a preferred embodiment, the reel or spool 44 installed on the second receiving platform is also the first reel or spool previously used on first source platform 41 during the initial drilling process; in this manner the total number of components required in the system is reduced, since spools and rigs, etc., are re-used again and again in successive stages of the installation process as segments of the pipeline are drilled and completed.

Figure 5:
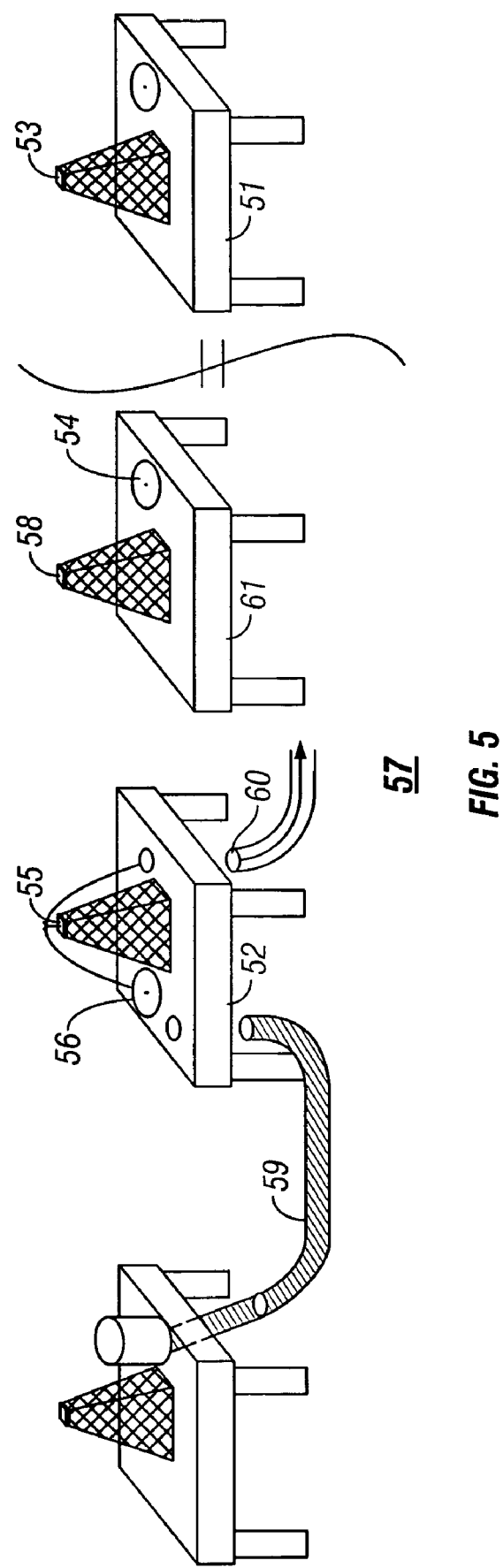
FIG. 5 depicts the first source platform and first and second receiving platforms shown in FIG. 1, wherein a first pipeline segment has been completed between the first source platform and the first receiving platform. The first receiving platform then becomes a second source platform, used to drill a second subsurface hole in the direction of the second receiving platform. The process depicted in FIGS. 1-4 is then repeated between the second source platform and the second receiving platform until a second pipeline segment has been completed therebetween. The above-described process is continued until the entire length of the pipeline route has been installed.

In the embodiment depicted in FIG. 5, a complete pipeline segment has been drilled and installed between the first source platform and the first receiving platform 52, and the first source platform is converted for use as a production platform. The first push/pull rig previously disposed on the first source platform is moved further down the line, as construction of subsequent receiving platforms is commenced. As before, the equipment and platform modules are then transported using modified ground, air or water vehicles, or in another more conventional manner, as dictated by the operating environment and/or environmental and regulatory concerns.

In the embodiment of FIG. 5, the push/pull rig previously used on the first source platform is moved to third receiving platform 51, and another push/pull rig 53 is installed so that third receiving platform 51 is prepared to commence operations when the pipeline segment being installed between second source platform 52 (which was previously considered to be the first receiving platform) and second receiving platform 61 is complete.

At this point, second drilling means 56 (for example, coiled tubing, pipe casing, drilling pipe, etc.) is used to drill a starter hole in the direction of second receiving platform 61. As before, an extended length of coiled tubing equipped with a pilot bit establishes a subsurface hole of desired length between second source platform 52 and second receiving platform 61. After the subsurface hole is completed using the transverse boring methods described above, additional segments of pipe or pipe casing are installed, so that another full segment of the pipeline is completed. Second receiving platform 61 then becomes a third source platform for purposes of installing a third segment of the pipeline in the direction of third receiving platform 51.

The process is then repeated and continued until the desired pipeline route is completed in the direction of a main pipeline or a storage terminal, or toward some other final destination appropriate for the fluid being transported. According to one embodiment of the invention, the connections between pipeline segments are made at the surface, so as to permit access to the line for running cleaners, and to permit safety inspections, etc. However, the connections may also be disposed in pits, basins or other underground locations, so that the entirety of the line is disposed beneath associated ground surface 57.

In some embodiments, access and security ports are left at points along the line (for example, it might be desirable to leave an access or security port at one or more of the platform locations as the line is installed), so that maintenance and security operations can be carried out after the pipeline has been completed and fluid transportation operations have commenced. In other embodiments, partial platforms are left at points along the line to house control valves or pig launch and recovery assemblies, and to provide intermediary access points at which the line can be entered for maintenance and security purposes.

Those of ordinary skill in the art will appreciate that while the invention has been described and illustrated above as a serial process in which a succession of subsurface holes are drilled and pipeline segments are sequentially installed between a succession of source locations and receiving locations, the invention can also be practiced as a parallel process in which a number of subsurface holes are drilled and filled with pipeline segments simultaneously between and amongst multiple geographic locations.

In short, the presently disclosed pipeline installation and maintenance method and system provides for assembly of numerous interconnectible platform modules into drilling platform from which segmented pipeline portions are flexibly installed, so that the platforms can thereafter be transported to and assembled above various other locations along the pipeline route. Further segments of the line are similarly constructed, either simultaneously or in stages, using the modified directional drilling techniques and transverse boring processes disclosed herein. Ultimately, a long series of adjacent pipeline segments are installed along the desired pipeline route, while associated ground surfaces suffer only minimal and temporary disturbance.

The foregoing specification is provided for illustrative purposes only, and is not intended to describe all possible aspects of the present invention. Moreover, while the invention has been depicted and described in detail with respect to several exemplary embodiments, those of ordinary skill in the pertinent arts will appreciate that minor changes to the description, and various other modifications, omissions and additions may also be made without departing from either the spirit or scope thereof.

What is claimed is:

1. A system for installing and maintaining a pipeline, said system comprising:
a first source platform disposed at a first drilling site, wherein said first source platform further comprises a first drilling means;
a first receiving platform disposed at a second drilling site, wherein said first receiving platform further comprises a second drilling means;
a first directional drilling rig disposed on said first source platform;
a second directional drilling rig disposed on said first receiving platform;
wherein said first directional drilling rig pushes said first drilling means from said first drilling site toward said second drilling site in a manner such that said first drilling means drills a subsurface hole between said first source platform and said first receiving platform.

2. The system of claim 1, wherein said first directional drilling rig is a first push/pull rig.

3. The system of claim 2, wherein said first push/pull rig pulls one or more of either pipe or pipe casing disposed on said first receiving platform back toward said first source platform through said subsurface hole drilled by said first drilling means.

4. The system of claim 1, wherein said second directional drilling rig is a second push/pull rig.

5. The system of claim 1, wherein one or more of said first drilling means and said second drilling means comprises a length of coiled tubing.

6. The system of claim 1, wherein one or more of said first drilling means and said second drilling means further comprises a fastening member.

7. The system of claim 6, wherein said first drilling means further comprises a first fastening member, and said second drilling means further comprises a second fastening member.

8. The system of claim 7, wherein one or more of said first fastening member and said second fastening member further comprises a swivel.

9. The system of claim 7, wherein one or more of said first fastening member and said second fastening member further comprises a grasping member.

10. The system of claim 1, wherein said first drilling means further comprises a pilot bit.

11. The system of claim 10, wherein said second drilling means further comprises a reaming assembly.

12. The system of claim 11, wherein said reaming assembly further comprises a drill bit having a diameter larger than a diameter of said pilot bit.

13. The system of claim 11, wherein said reaming assembly further comprises a fastening member.

14. The system of claim 11, wherein said reaming assembly further comprises a downhole motor.

15. A method of installing and maintaining a pipeline, said method comprising:
disposing a first source platform at a first drilling site;
disposing a first receiving platform at a second drilling site;
disposing a first directional drilling rig on said first source platform;
disposing a second directional drilling rig on said first receiving platform;
disposing a first drilling means on said first source platform; and
using said first directional drilling rig to push said first drilling means from said first drilling site toward said second drilling site in a manner such that said first drilling means drills a subsurface hole between said first source platform and said first receiving platform.

16. The method of claim 15, wherein said disposing a first directional drilling rig on said first source platform further comprises disposing a first push/pull rig on said first source platform.

17. The method of claim 16, further comprising using said first push/pull rig to pull one or more of either pipe or pipe casing disposed on said first receiving platform back toward said first source platform through said subsurface hole drilled by said first drilling means.

18. The method of claim 15, wherein said disposing a second directional drilling rig on said first receiving platform further comprises disposing a second push/pull rig on said first receiving platform.

19. The method of claim 15, further comprising disposing a second drilling means on said first receiving platform.

20. The method of claim 19, wherein said disposing said first drilling means and said disposing a second drilling means further comprises disposing a length of coiled tubing.

21. The method of claim 19, wherein one or more of said disposing a first drilling means and said disposing a second drilling means further comprises disposing a fastening member.

22. The method of claim 21, wherein said disposing a first drilling means further comprises disposing a first fastening member, and said disposing a second drilling means further comprises disposing a second fastening member.

23. The method of claim 22, wherein one or more of said disposing a first fastening member and said disposing a second fastening member further comprises disposing a swivel.

24. The method of claim 22, wherein one or more of said disposing a first fastening member and said disposing a second fastening member further comprises disposing a grasping member.

25. The method of claim 19, wherein said disposing a first drilling means further comprises disposing a pilot bit.

26. The method of claim 25, wherein said disposing a second drilling means further comprises disposing a reaming assembly.

27. The method of claim 26, wherein said disposing a reaming assembly further comprises disposing a drill bit having a diameter larger than a diameter of said pilot bit.

28. The method of claim 26, wherein said disposing a reaming assembly further comprises disposing a fastening member.

29. The method of claim 26, wherein said disposing a reaming assembly further comprises disposing a downhole motor.

* * * * *